US006926311B2

(12) United States Patent
Chang et al.

(10) Patent No.: US 6,926,311 B2
(45) Date of Patent: Aug. 9, 2005

(54) APPARATUS FOR QUICK CONNECTION

(75) Inventors: Kai-Hsiang Chang, Pan-Chiao (TW); Po-Jen Hsueh, Taipei (TW)

(73) Assignee: Apex Medical Corp., Taipei Hsien (TW)

( * ) Notice: Subject to any disclaimer, the term of this patent is extended or adjusted under 35 U.S.C. 154(b) by 92 days.

(21) Appl. No.: 10/653,148

(22) Filed: Sep. 3, 2003

(65) Prior Publication Data

US 2005/0046184 A1 Mar. 3, 2005

(51) Int. Cl.$^7$ ............................ F16L 37/00; F16L 39/00
(52) U.S. Cl. ..................... 285/317; 285/87; 285/308; 285/124.1; 285/124.3; 285/124.5
(58) Field of Search ................................. 285/317, 308, 285/82, 87, 124.1, 124.2, 124.3, 124.4, 124.5

(56) References Cited

U.S. PATENT DOCUMENTS

| 793,103 | A | * | 6/1905 | Scholtz ........................ 285/113 |
|---|---|---|---|---|
| 3,159,412 | A | * | 12/1964 | Descarries ...................... 285/7 |
| 3,469,863 | A | * | 9/1969 | Riester et al. ............. 285/124.4 |
| 4,116,476 | A | * | 9/1978 | Porter et al. .............. 285/124.4 |
| 4,703,957 | A | | 11/1987 | Blenkush |
| 4,804,208 | A | * | 2/1989 | Dye ............................ 285/26 |
| 4,863,201 | A | * | 9/1989 | Carstens ..................... 285/317 |
| 5,201,552 | A | * | 4/1993 | Hohmann et al. ........ 285/124.4 |
| 5,219,185 | A | * | 6/1993 | Oddenino ..................... 285/26 |
| 5,323,808 | A | * | 6/1994 | Shimizu ...................... 137/594 |
| 6,443,498 | B1 | * | 9/2002 | Liao ......................... 285/124.1 |
| 2003/0146619 | A1 | * | 8/2003 | Souvatzidis et al. ..... 285/124.5 |
| 2003/0193188 | A1 | * | 10/2003 | Miros ....................... 285/124.5 |

* cited by examiner

Primary Examiner—James M. Hewitt
(74) Attorney, Agent, or Firm—Birch, Stewart, Kolasch & Birch, LLP

(57) ABSTRACT

A quick connector connects a pump and a fluid container is disclosed. The quick connector includes an upper component, a lower component, at least a telescopic tube, a connector body, and a soft cover. The upper component includes a first groove and a first buckle on one side thereof. The lower component has a second grove and a second buckle at locations corresponding to the first buckle and the first groove of the upper component, so that the upper component can be fitted to the lower component with the buckles and grooves. The telescopic tube is fitted between the upper component and the lower component to fasten the two components, and is connected to the fluid container at one end. The connector body includes an inner tube corresponding to the telescopic tube, and at least a movable board. The inner tube is partially overlaid inside telescopic tube, and is connected to the pump at one end. The movable board is fitted to the connector body with a turning shaft, and is rotary. The movable board has a buckle for connecting either the upper component or the lower component. The soft cover covers the connector body, while exposing the buckle of the movable board.

7 Claims, 7 Drawing Sheets

APPARATUS FOR QUICK CONNECTION

FIELD OF THE INVENTION

The present invention relates to an apparatus for quick connection between a pump and a fluid container and, more particularly, to an ergonomic apparatus for connecting an inflatable mattress for inflation.

BACKGROUND OF THE INVENTION

Conventional inflatable mattresses use a connector to connect a pump to inflate or deflate the airbags inside the mattress. As shown in FIG. 1, a connector 1 has a single tube, comprising an outer tube 11 for connecting to an airbag of a mattress (not shown), an inner tube 12 for connecting a pump, and a click device 110 for connecting an outer tube 11 and an inner tube 12. To connect tubes 11 and 12, the following steps are taken: compressing the click device 110 (as indicated by arrow shown in FIG. 1), inserting the inner tube 12 into the outer tube 11, then releasing the click device 110. The inner tube 12 and the outer tube 11 are firmly connected together by the click device 110.

However, it is usually difficult to manufacture the click device of the aforementioned connector, as the click device 110 must be fitted into an end of the outer tube 11, and then uses a screw 111 to fix to the outer tube 11. Furthermore, in order to have an airtight connection between the inner tube 12 and the outer tube 11, the click device 110 must provide a tight fitting, which makes it harder for users to mount and dismount the tubes 11 and 12.

Another invention of the inventor, Taiwan Paten No. 171723, titled "Quick Connector", discloses another conventional connecting device for reference.

SUMMARY OF THE INVENTION

To eliminate the disadvantages of the conventional connectors, the present invention provides a quick connector for connecting a pump and a fluid container. The quick connector comprises an upper component, a lower component, at least a telescopic tube, a connector body, and a soft cover. The upper component comprises a first groove and a first buckle on one side thereof. The lower component has a second grove and a second buckle at locations corresponding to the first buckle and the first groove of the upper component, so that the upper component can be fitted to the lower component with the buckles and grooves. The telescopic tube is fitted between the upper component and the lower component to fix the components together, and is connected to the fluid container at one end. The connector further comprises an inner tube corresponding to the telescopic tube, and at least a movable board. The inner tube is partially overlaid inside telescopic tube, and is connected to the pump at one end. The movable board is fitted to the connector with a turning shaft, and is rotary. The movable board has a buckle for connecting either the upper component or the lower component. The soft cover covers the connector body, while exposing the buckle of the movable board.

The present invention has the advantage of being a unitary device, so that it requires no screw and is easy to assemble and disassemble. The present invention can also be used in other types of fluids, such as water. The soft cover of the present invention is ergonomic and provides a softer touch to users.

These and other objects, features and advantages of the invention will be apparent to those skilled in the art, from a reading of the following brief description of the drawings, the detailed description of the preferred embodiment, and the appended claims.

DETAILED DESCRIPTION OF THE PREFERRED EMBODIMENT

Figure 1:
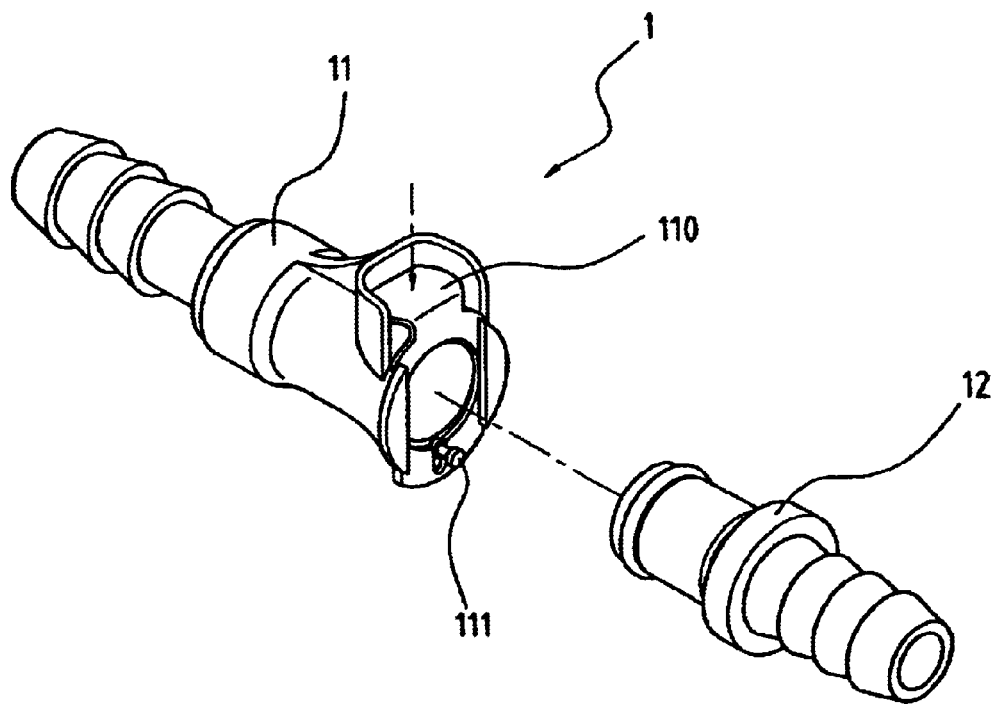
FIG. 1 shows a conventional connector.
Figure 2:
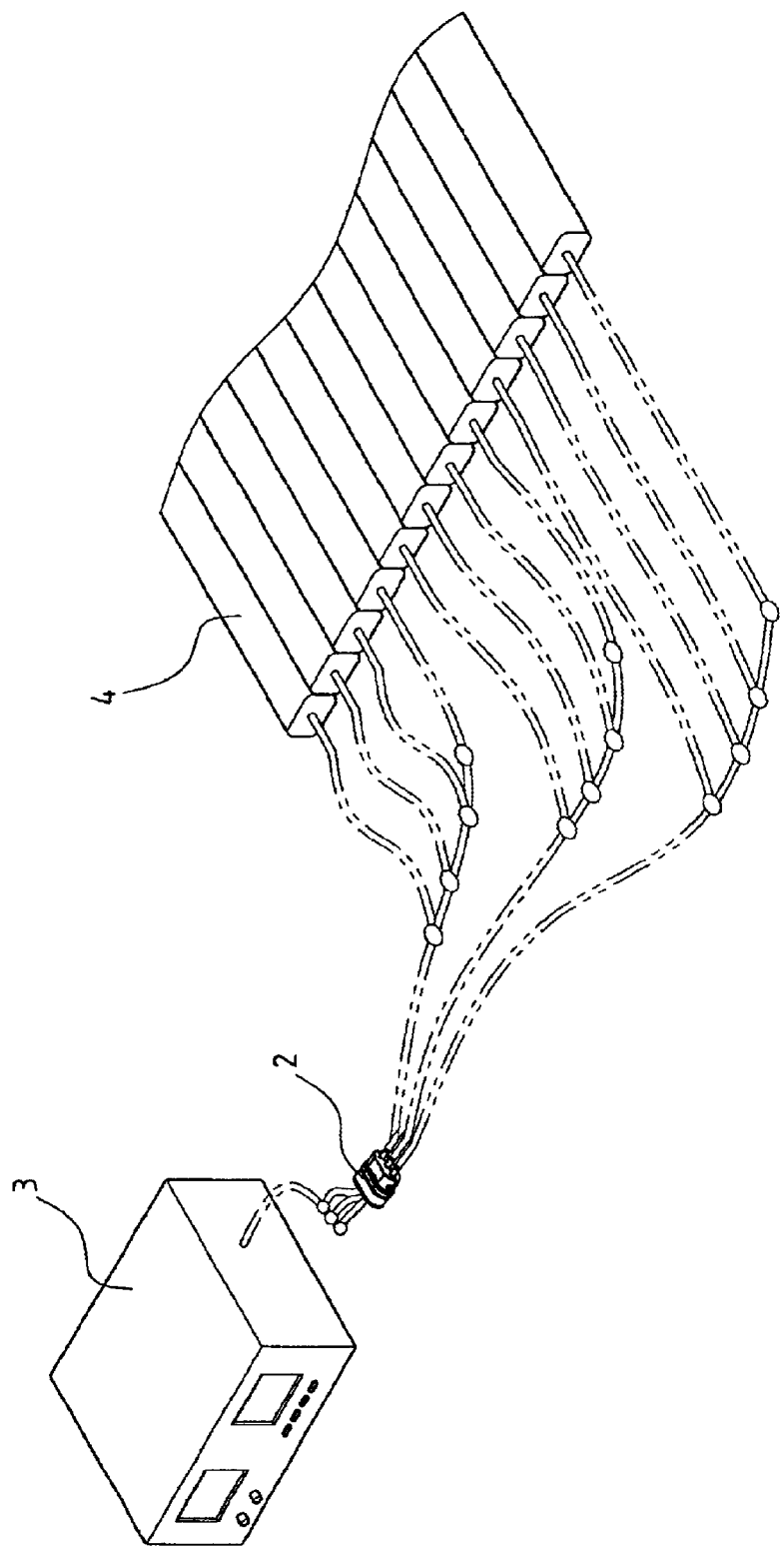
FIG. 2 shows the use of an embodiment of the present invention.

FIG. 2 shows a quick connector 2 of the present invention used to connect a pump 3 and a fluid container 4. Preferably, the fluid container 4 is an airbag of an inflatable mattress, and more particularly, a medical inflatable mattress that uses a pump to inflate or deflate the airbag, so that the mattress provides massage to chronic bed-bound patients to relieve the pain and pressure. Although the fluid container 4 of the instant embodiment is an inflatable mattress, for those having ordinary skills, it is obvious that the present invention can also be applied to other types of fluid containers, such as water pipes. The present invention also provides a leak-proofed connection for water pipes.

Figure 3:
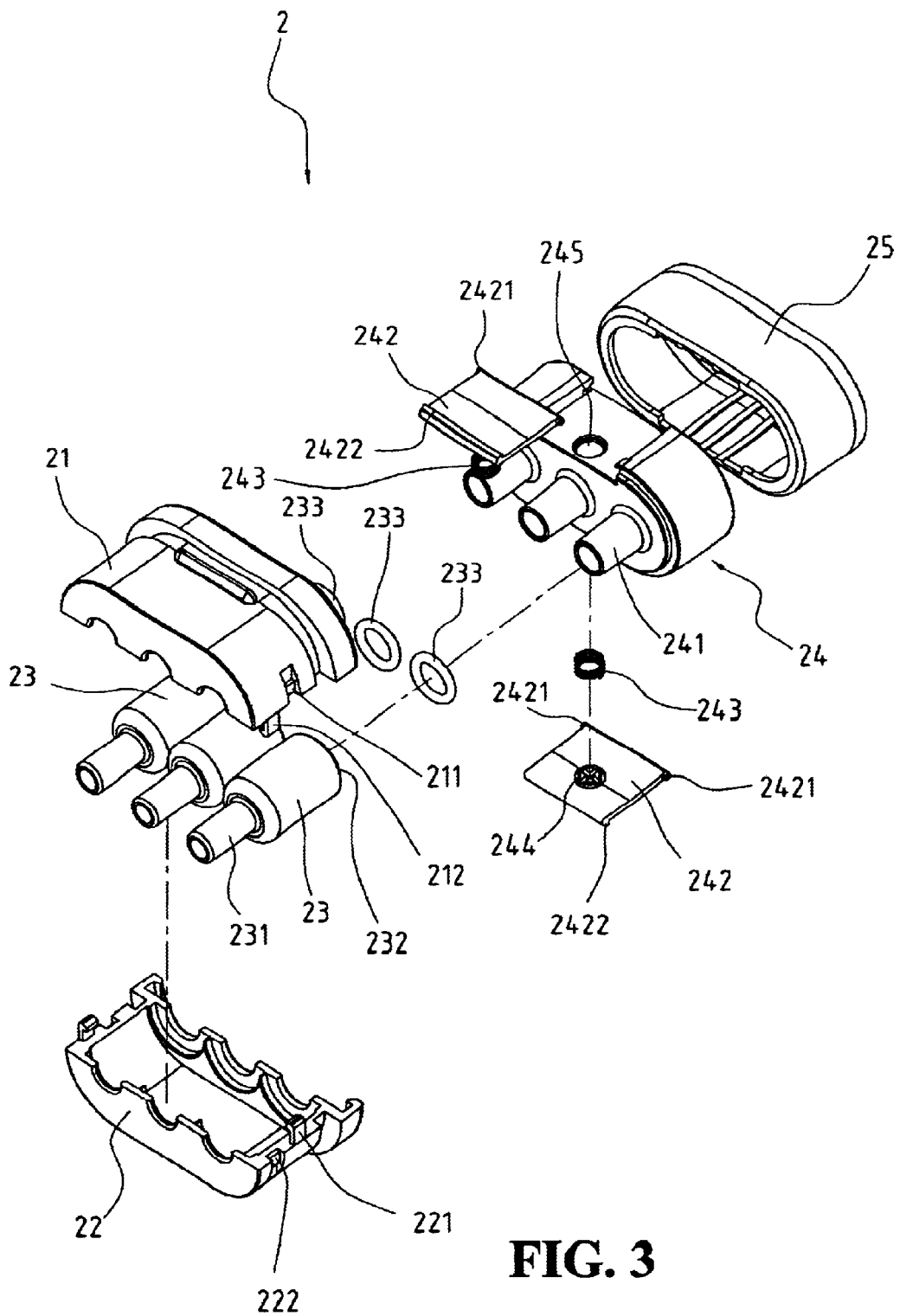
FIG. 3 shows an exploded view of the present invention.
Figure 4:
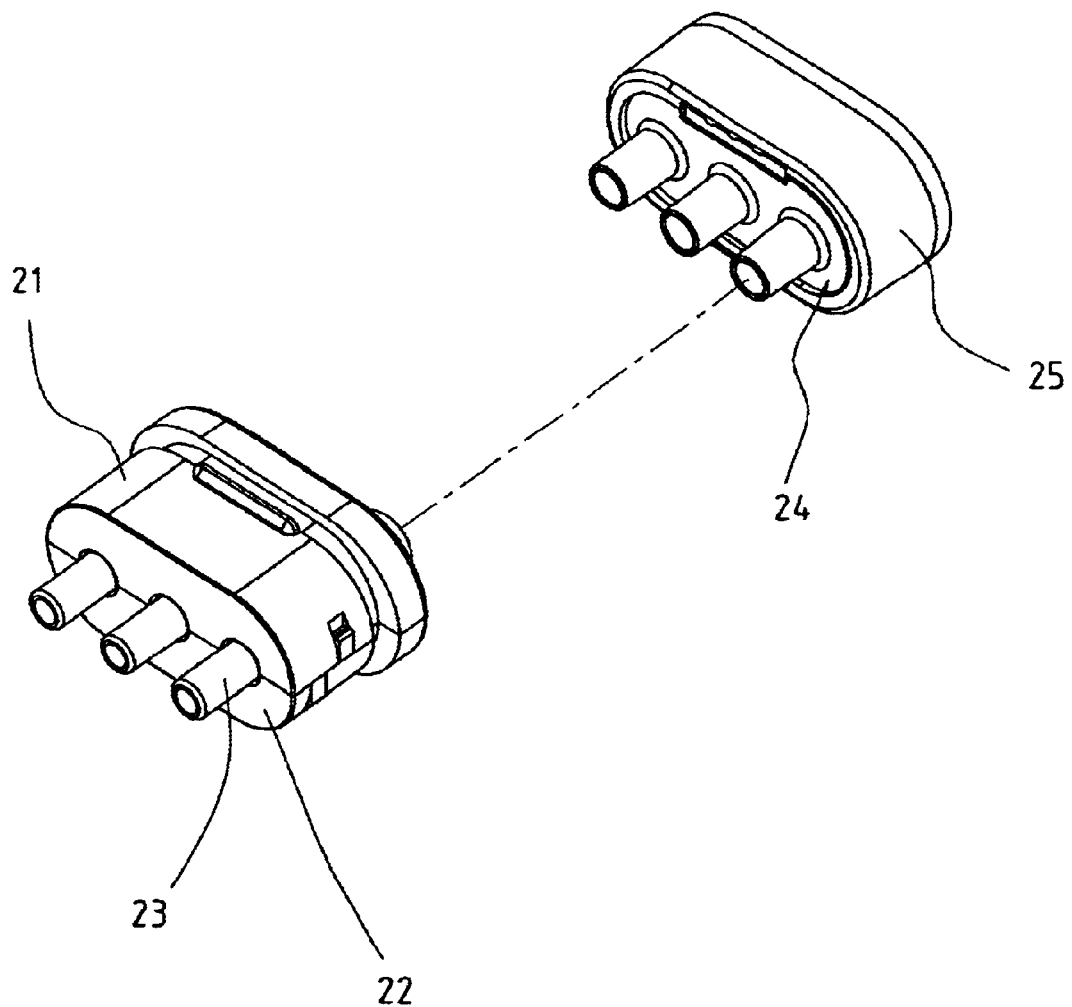
FIG. 4 shows half-finished product of the present invention.

FIG. 3 shows a quick connector 2, comprising an upper component 21, a lower component 22, a telescopic tube 23, a connector body 24, and a soft cover 25. The upper component 21 has a first groove 211 and a first buckle 212 on one side thereof. The lower component 22 has a second buckle 221 and a second groove 222. By buckling the first buckle 212 to the second grove 222, and the second buckle 221 to the first groove 211, the upper component 21 and the lower component 22 are fitted together. In addition, the upper component 21 and the lower component 22 of the present invention are manufactured with the same mold. This reduces manufacturing time and product cost by mass production. As shown in FIG. 3, the grooves 211, 222, and the buckles 212, 221 are located on one side of the upper component 21 and the lower component 22. Similarly, those having ordinary skills can easily conclude that the grooves 211, 222 and the buckles 212, 221 can be placed on both sides of the upper component 21 and the lower component 22 to provide a tighter fitting. The telescopic tube 23 is located and fixed between the upper component 21 and the lower component 22 by the fitting of the components 21, 22. An end 231 of the telescopic tube 23 is connected to a fluid container 4 (shown in FIG. 2). In this preferred embodiment, the telescopic tube 23 further comprises an O-ring 233, used with the other end 232 of the telescopic tube 23 to prevent overflow of the fluid inside the tube. Although FIG. 3 shows three telescopic tubes 23 in this embodiment, the number of the telescopic tubes can be either one, two, or even multiple for higher throughput. The number of the telescopic tubes depends on the widths of the upper component 21 and the lower component 22, and the number of the 0-rings is preferably the same as the number of the telescopic tubes.

Figure 5A:
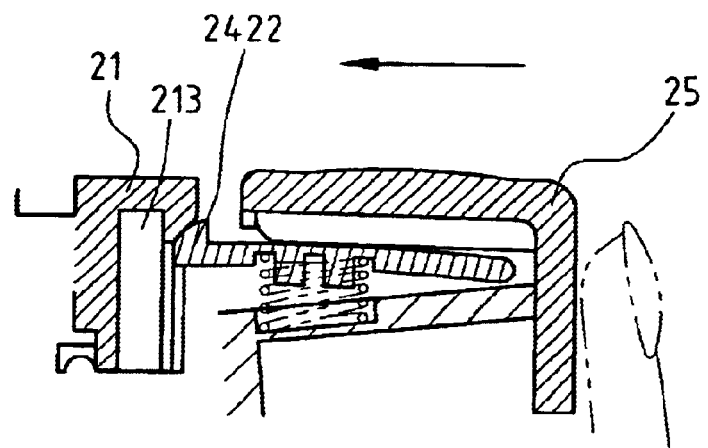
FIG. 5A is a cross-sectional view showing the present invention before assembly.
Figure 5B:
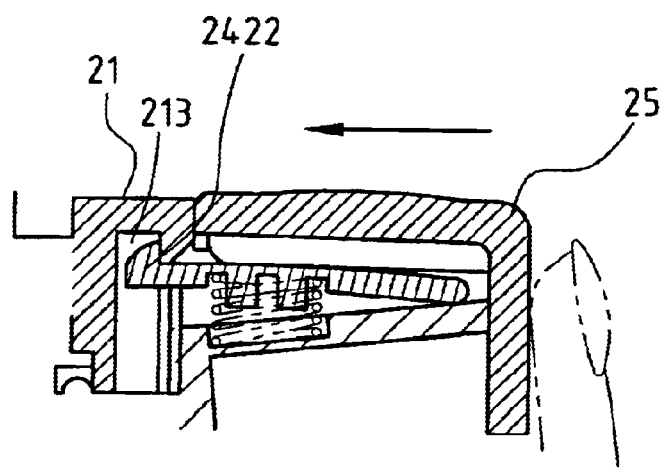
FIG. 5B is similar to FIG. 5A but showing the present invention after assembly.
Figure 6A:
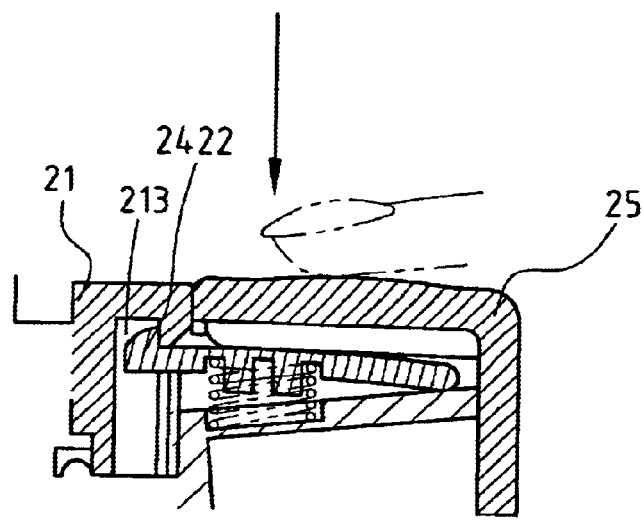
FIG. 6A is a cross-sectional view showing the present invention before disassembly.
Figure 6B:
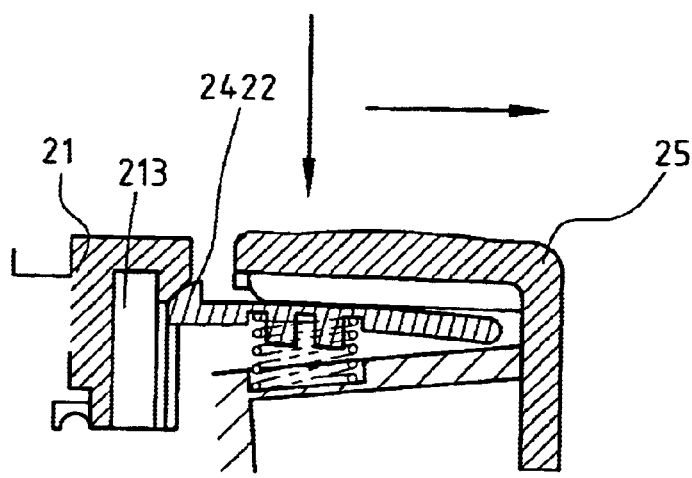
FIG. 6B is similar to FIG. 6A but showing the present invention after disassembly.
Figure 7:
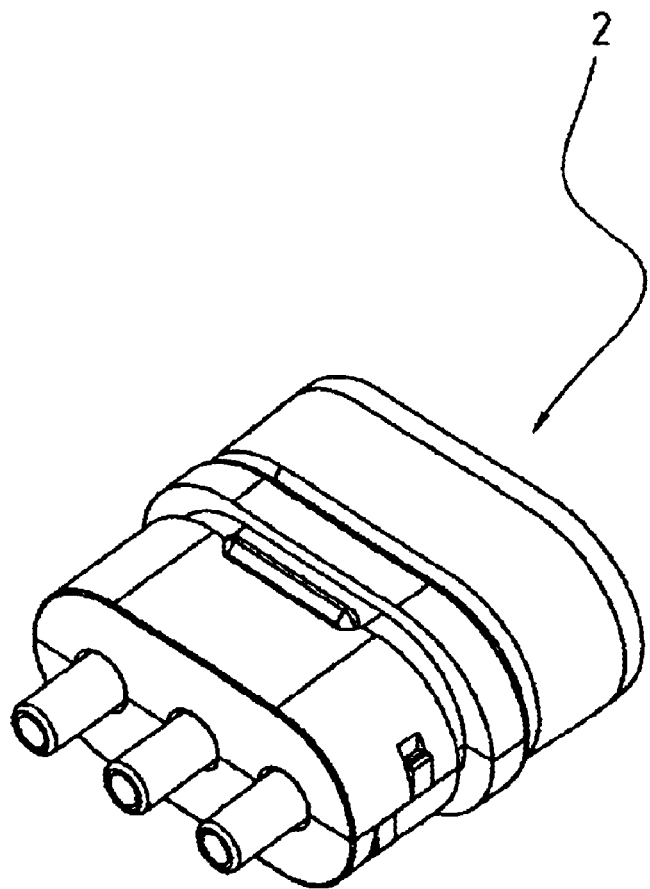
FIG. 7 shows an assembled view of the present invention.

The connector body 24 has the same number of inner tubes 241 as the telescopic tubes 23. The telescopic tube 23 overlays partially over the inner tube 241. The inner tube 241 is connected to a pump 3 at one end (partially shown in FIG. 2). The connector body 24 further comprises at least a movable board 242. A movable board 242 is fitted to the connector body 24 with a turning shaft 2421, and is rotary. The movable board 242 has a buckle 2422 for buckling to the upper component 21 or the lower component 22 (shown in FIGS. 5A and 5B). The Figure shows two movable boards 242 for connecting to both upper component 21 and the lower component 22 in this embodiment to provide a better fitting. Other embodiments can have only one movable board 242, placed at the top of the connector body 24 for connecting the upper component 21, or placed underneath the connector body 24 for connecting the lower component 22.

In the preferred embodiment, the connector body 24 further comprises at least a spring 243, located on the inner side of the movable board 242. The elasticity of spring 243 makes the buckling between the movable board 242 and the upper component 21 or the lower component 22 tighter. Similarly, the number of springs 243 should be the same as the number of the movable boards 242. Furthermore, the connector body 24 can further comprise corresponding grooves 245 for the spring 243 to be fitted in. The inner side of the movable board 242 can also comprise corresponding grooves 245 for the spring 243 to be fitted in.

The soft cover 25 is used to cover the connector body 24, while exposing the buckle 2422 of the movable board 242. The soft cover 25 is preferably a rubber cover, in order to provide a more ergonomic and better touch to the user. Furthermore, using rubber for the soft cover 25 also enables users to sense the position underneath the soft cover 25, which makes easier for assembly and disassembly.

The present invention discloses a connector having the advantage of being unitary, so that it requires no screws and is easy to assemble and disassemble. Although the embodiment described is a quick connector for connecting an inflatable mattress, the present invention can also be used in other types of fluids, such as water. The soft cover of the present invention is ergonomic, and provides a softer touch to users, so that the user can assemble and disassemble the connector without peeling the soft cover.

While the invention has been described in connection with what is presently considered to the most practical and preferred embodiment, it is to be understood that the invention is not to be limited to the disclosed embodiment, but, on the contrary, it should be clear to those skilled in the art that the description of the embodiment is intended to cover various modifications and equivalent arrangement included within the spirit and scope of the appended claims.

What is claimed is:

1. An apparatus for quick connection, for connecting a pump and a fluid container, comprising:

an upper component, comprising a first groove and a first buckle on the side;

a lower component, comprising a second groove and a second buckle, placed at locations corresponding to the first buckle and the first groove of the upper component, the first buckle being buckled to the second groove and the second buckle being buckled to the first groove to provide fitting between the lower component and the upper component;

at least a telescopic tube, fitted between the upper component and the lower component and fastened by the two components, and connected to the fluid container at one end;

a connector body, comprising an inner tube corresponding to the telescopic tube, and at least a movable board, the inner tube being partially inside the telescopic tube, and being connected to the pump at one end, the movable board being fitted to the connector body with a turning shaft and being rotary, the movable board having a buckle for connecting either the upper component or the lower component; and a soft cover, covering the connector body, while exposing the buckle of the movable board.

2. The apparatus as claimed in claim 1, wherein the fluid container is an airbag of an inflatable mattress.

3. The apparatus as claimed in claim 1, wherein the telescopic tube comprises an O-ring, located at one end of the telescopic tube to prevent overflow of fluid inside the tube.

4. The apparatus as claimed in claim 1, wherein the connector body comprises a spring, located on an inner side of the movable board to provide a tight fitting between the movable board and one of the upper and lower components.

5. The apparatus as claimed in claim 4, wherein the connector body has a groove for the spring to be fitted in.

6. The apparatus as claimed in claim 4, wherein the inner side of the movable board has a groove for the spring to be fitted in.

7. The apparatus as claimed in claim 1, wherein the soft cover is a rubber soft cover.

* * * * *